US006777090B2

(12) United States Patent
Baumgart et al.

(10) Patent No.: US 6,777,090 B2
(45) Date of Patent: Aug. 17, 2004

(54) SUBSTANCE MIXTURE WHICH CAN BE CURED THERMALLY AND BY USING ACTINIC RADIATION, AND THE USE THEREOF

(75) Inventors: Hubert Baumgart, Münster (DE); Uwe Meisenburg, Duisburg (DE); Heinz-Peter Rink, Münster (DE); Paul J. Harris, West Bloomfield, MI (US); Reinhold Schwalm, Wachenheim (DE)

(73) Assignee: BASF Coatings AG, Munster (DE)

( * ) Notice: Subject to any disclaimer, the term of this patent is extended or adjusted under 35 U.S.C. 154(b) by 231 days.

(21) Appl. No.: 10/130,934

(22) PCT Filed: Nov. 29, 2000

(86) PCT No.: PCT/EP00/11959
§ 371 (c)(1),
(2), (4) Date: Jun. 19, 2002

(87) PCT Pub. No.: WO01/46285
PCT Pub. Date: Jun. 28, 2001

(65) Prior Publication Data
US 2003/0091833 A1 May 15, 2003

(30) Foreign Application Priority Data
Dec. 22, 1999  (DE) ......................................... 199 61 926

(51) Int. Cl.$^7$ .................... B32B 31/26; B32B 31/28; B32B 27/30; B32B 27/38; C06F 271/00
(52) U.S. Cl. .................. 428/423.1; 428/413; 428/523; 522/1; 522/100; 525/278
(58) Field of Search ................................ 428/413, 523, 428/423.1; 522/1, 100; 525/278

(56) References Cited

U.S. PATENT DOCUMENTS

| | | | | |
|---|---|---|---|---|
| 4,419,513 | A | 12/1983 | Breidenbach et al. | 544/222 |
| 4,454,317 | A | 6/1984 | Disteldorf et al. | 544/193 |
| 4,710,542 | A | 12/1987 | Forgione et al. | 525/127 |
| 4,801,675 | A | 1/1989 | Pedain et al. | 528/73 |
| 5,258,482 | A | 11/1993 | Jacobs et al. | 528/49 |
| 5,290,902 | A | 3/1994 | Jacobs et al. | 528/49 |
| 5,356,669 | A | 10/1994 | Rehfuss et al. | 427/407.1 |
| 5,474,811 | A | 12/1995 | Rehfuss et al. | 427/407.1 |
| 5,523,443 | A * | 6/1996 | Gaglani | 556/421 |
| 5,606,965 | A | 3/1997 | Panz et al. | 126/360 |
| 6,342,144 | B1 * | 1/2002 | December | 204/488 |

FOREIGN PATENT DOCUMENTS

| | | | |
|---|---|---|---|
| CA | 2163591 | 11/1995 | C07D/251/34 |
| EP | 008 127 | 8/1979 | E21F/17/00 |
| EP | 192 304 | 2/1986 | C09D/5/04 |
| EP | 245 700 | 4/1987 | C07D/251/54 |
| EP | 249 201 | 6/1987 | C09D/3/58 |
| EP | 276 501 | 9/1987 | C11D/1/42 |
| EP | 303 150 | 1/1988 | C07C/119/42 |
| EP | 496 208 | 9/1992 | C08G/18/79 |
| EP | 524 500 | 9/1992 | C08G/18/02 |
| EP | 549 116 | 11/1992 | C08G/18/67 |
| EP | 566 037 | 4/1993 | C08G/18/79 |
| EP | 594 068 | 10/1993 | C09D/201/02 |
| EP | 594 071 | 10/1993 | C09D/201/02 |
| EP | 594 142 | 10/1993 | C08L/57/12 |
| EP | 640 608 | 8/1994 | C08G/18/00 |
| EP | 649 806 | 10/1994 | B65H/19/30 |
| EP | 928 800 | 12/1998 | C08G/18/81 |
| GB | 1220717 | 9/1968 | H01F/27/00 |
| WO | WO94/10211 | 5/1994 | C08F/8/30 |
| WO | WO94/10212 | 5/1994 | C08F/8/30 |
| WO | WO94/10213 | 5/1994 | C08F/8/30 |
| WO | WO94/22968 | 10/1994 | C09D/133/06 |
| WO | WO97/12945 | 4/1997 | C09D/5/04 |
| WO | WO 97/49745 | 12/1997 | C08G/18/08 |
| WO | WO97/49747 | 12/1997 | C08G/18/75 |

OTHER PUBLICATIONS

English Abstract for EP 008 127.
English Abstract for ep 928 800.
B. Singh and co–workers "Carbamylmethylated Melamines, Novel Crosslinkers for the Coatings Industry" in Advanced Organic Coatings Science and Technology Series, 1991, vol. 13, pp. 193 to 207.
"Paints, Coatings and Solvents", second completely revised edition, edited by D. Stoye and W. Freitag, Wiley–VCH, Weinheim, New York, 1998, pp. 80 ff.
English Abstract for WO94/22968 is on the front page of the International Publication.

* cited by examiner

Primary Examiner—Philip Tucker
Assistant Examiner—Michael Feely

(57) ABSTRACT

Composition curable thermally and with actinic radiation (dual-cure composition) comprising A) at least one constituent containing on average per molecule at least one primary or secondary carbamate group and at least one bond which can be activated with actinic radiation and preparable by from polyfunctional compounds containing at least two isocyanate-reactive, acid-reactive or epoxide-reactive functional groups and suitable monoisocyanates, monoacids or monoepoxides or from polyisocyanates, polyacids or polyepoxides and suitable compounds which contain an isocyanate-reactive, acid-reactive or epoxide-reactive functional group; and B) at least one constituent containing on average per molecule at least one carbamate-reactive functional group and also, where appropriate, at least one bond which can be activated with actinic radiation;

and its use as adhesive, sealing compound and coating material.

16 Claims, No Drawings

SUBSTANCE MIXTURE WHICH CAN BE CURED THERMALLY AND BY USING ACTINIC RADIATION, AND THE USE THEREOF

This application is a National Phase Application of Patent Application PCT/EP00/11959 filed on Nov. 29, 2000.

The present invention relates to novel compositions curable thermally and with actinic radiation (dual-cure compositions). The present invention also relates to the use of the novel dual-cure compositions as adhesives and sealing compounds and as coating materials in automotive OEM finishing, automotive refinish, furniture coating, and industrial coating, including coil coating, container coating and the coating of electrical components. The present invention additionally relates to novel processes for preparing dual-cure compositions. The present invention further relates to novel processes for producing adhesive films, seals and single-coat or multicoat clearcoat systems or color and/or effect paint systems on primed and unprimed substrates using dual-cure compositions. The present invention relates not least to primed and unprimed substrates which feature the novel adhesive films, seals and/or single-coat or multicoat clearcoat systems or color and/or effect paint systems.

Coatings, especially single-coat or multicoat clearcoat systems or color and/or effect paint systems, seals and adhesive films which are three-dimensionally crosslinked by way of urethane groups have numerous advantages which include a comparatively high weathering stability, chemical resistance and mar resistance. Manufacturers and users are therefore equally endeavored to provide coating materials, adhesives and sealing compounds whose constituents are easy to prepare and which provide polyurethane coatings, adhesive films and seals with an ever further improved and optimized profile of properties.

In this context, coating materials, adhesives and sealing compounds which are curable both thermally and with actinic radiation (dual-cure coating materials, adhesives and sealing compounds) are increasingly gaining in interest, since they offer numerous advantages.

Firstly, for instance, dual-cure coating materials are more suited to the coating of heat-sensitive substrates than are coating materials curable only by means of heat, since in the dual-cure systems any incomplete thermal curing at low temperatures may be compensated by curing with actinic radiation, resulting overall in coatings having good performance properties. Secondly, dual-cure coating materials are more suited to the coating of three-dimensional substrates of complex shape than are coating materials curable with actinic radiation only, since incomplete radiation curing in the shadow regions of the substrates may be compensated by thermal curing, resulting overall, here again, in coatings having good performance properties.

The same applies mutatis mutandis, to the dual-cure adhesives and sealing compounds as well.

Dual-cure coating materials providing coatings containing urethane groups in their three-dimensional network are known.

For instance, European patent EP-A-0 549 116 describes a dual-cure coating material which comprises a constituent containing free isocyanate groups and photopolymerizable, olefinically unsaturated double bonds, a reactive diluent and also, where appropriate, a photoinitiator. Films of this known dual-cure coating material are cured initially with actinic radiation, especially UV light. Thereafter, the resulting coatings are subjected to a moisture cure, as a result of which the three-dimensional network is consolidated by the formation of urethane group and urea groups from the free isocyanate groups. A disadvantage is that the crosslinking partners contemplated comprise only water and no other isocyanate-reactive constituents, crosslinkers or binders containing isocyanate-reactive groups, for example. Accordingly, a very important possibility of broadly varying the profile of properties of the dual-cure coating materials and of the coatings produced from them is absent. Moreover, the result of the water cure is highly dependent on the atmospheric humidity employed, the temperature, the network density, and other parameters, and so is difficult to reproduce.

The European patent application EP-A-0 928 800, on the other hand, discloses a dual-cure coating material which comprises a urethane (meth)acrylate containing free isocyanate groups and (meth)acryloyl groups, a photoinitiator and an isocyanate-reactive compound, particularly a polyol or polyamine. This dual-cure coating material does afford the possibility of varying the profiles of properties of coating material and of coating and of adapting them in a targeted way to different end uses.

The disadvantage of both known dual-cure coating materials is that they comprise what are known as two-component systems, in which the constituents containing free isocyanate groups have to be stored separately from the constituents containing the isocyanate-reactive groups and/or in the absence of water, up until the time of application, in order to avoid premature crosslinking. To accomplish this, however, necessitates a relatively high level of technical and planning effort in terms of storage, production and application.

The same applies, mutatis mutandis, to the corresponding dual-cure adhesives and sealing compounds as well.

This effort is not required, admittedly, with the coating materials known from U.S. Pat. Nos. 5,474,811, 5,356,669, 5,605,965, WO 94/10211, WO 94/10212, WO 94/10213, EP-A-0 594 068, EP-A-0 594 071 or EP-A-0 594 142. These coating materials comprise at least one oligomer and/or polymer containing at least one pendant and/or terminal carbamate group of the formula:

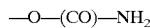

and at least one crosslinking agent containing at least two carbamate-reactive groups. These known coating compositions therefore constitute one-component systems and provide clearcoats which exhibit extremely high mar resistance and etch resistance. However, they cannot be cured additionally using actinic radiation. The same applies to the corresponding dual-cure adhesives and sealing compounds.

It is an object of the present invention to provide novel dual-cure compositions which no longer have the disadvantages of the prior art and which provide coatings, adhesive films and seals which contain urethane groups and have excellent performance properties. In particular, the novel dual-cure compositions ought to constitute one-component systems, in which binder and crosslinking agent are present alongside one another without prematurely crosslinking.

Following application, they ought to crosslink rapidly under the influence of heat and actinic radiation, at comparatively low temperatures, so that they are also suitable for the coating, bonding and sealing of thermally sensitive substrates. The resulting novel coatings, adhesive films and seals ought to exhibit excellent weathering stability, chemical resistance, hardness, flexibility and mar resistance, so that they are highly suitable in particular for automotive OEM finishing, automotive refinishing, furniture coating and industrial coating, including coil coating, container coating and the coating of electrical components, and also the bonding and sealing of the substrates used in these applications.

Found accordingly have been the novel compositions curable thermally and with actinic radiation (dual-cure compositions) which comprise A) at least one constituent containing on average per molecule at least one primary or secondary carbamate group and at least one bond which can be activated with actinic radiation, which constituent is preparable by
1. in accordance with a first variant
  1.1 in a first process step, reacting at least one polyfunctional compound containing at least two isocyanate-reactive, acid-reactive or epoxide-reactive functional groups with in each case at least one compound containing an isocyanate group, acid group or epoxide groups and also at least one bond which can be activated with actinic radiation, and subsequently, in a second process step, reacting the resultant intermediate, which on average still contains at least one free isocyanate-reactive, acid-reactive or epoxide-reactive functional group, with in each case at least one compound by means of which carbamate groups are introduced; or
  1.2 in a first process step, reacting at least one polyfunctional compound containing at least two isocyanate-reactive, acid-reactive or epoxide-reactive functional groups with in each case at least one compound by means of which carbamate groups. are introduced, and subsequently, in a second process step, reacting the resultant intermediate, which on average still contains at least one free isocyanate-reactive, acid-reactive or epoxide-reactive functional group, with in each case at least one compound containing an isocyanate group, acid group or epoxide groups and also at least one bond which can be activated with actinic radiation;
2. in accordance with a second variant
  2.1 in a first process step, reacting at least one polyisocyanate, polyacid or polyepoxide with in each case at least one compound containing at least one bond which can be activated with actinic radiation and also one and also one isocyanate-reactive, acid-reactive or epoxide-reactive functional group, and subsequently reacting the resultant intermediate, which on average still contains at least one isocyanate group, acid group or epoxide group, in a second process step with in each case at least one compound containing at least one carbamate group or at least one functional groups which can be converted into carbamate groups, and also containing an isocyanate-reactive, acid-reactive or epoxide-reactive functional group; or
  2.2 in a first process step, reacting at least one polyisocyanate, polycarboxylic acid or polyepoxide with in each case at least one compound containing at least one carbamate group or at least one functional groups which can converted into carbamate groups, and also an isocyanate-reactive, acid-reactive or epoxide-reactive functional group, and subsequently reacting the resultant intermediate, which on average still contains at least one isocyanate group, acid group or epoxide group, in a second process step with in each case at least one compound containing at least one bond which can be activated with actinic radiation and also one isocyanate-reactive, acid-reactive or epoxide-reactive functional group; or
3. in accordance with a third variant, reacting at least one polyisocyanate, polyacid or polyepoxide in a one-pot process with at least one compound containing at least one carbamate group or at least one functional groups which can be converted into carbamate groups, and also one isocyanate-reactive, acid-reactive or epoxide-reactive functional group, and at least one compound containing at least one bond which can be activated with actinic radiation and also one isocyanate-reactive, acid-reactive or epoxide-reactive functional group; and B) at least one constituent containing on average per molecule at least one carbamate-reactive functional group and also, if desired, at least one bond which can be activated with actinic radiation.

The novel compositions curable thermally and with actinic radiation are referred to below as "dual-cure compositions of the invention".

Further subject matter of the invention will emerge from the description, the manner of designation indicated above being employed mutatis mutandis.

In the light of the prior art it was surprising and unforeseeable for the skilled worker that the object on which the present invention is based could be achieved by means of the dual-cure composition of the invention. In particular it was surprising that it was possible to prepare the dual-cure composition of the invention in a simple way and to store it without problems, even at relatively high temperature and/or atmospheric humidity, until its use. A particular surprise was the broad usefulness of the dual-cure composition of the invention. Thus it was outstandingly suitable for the preparation of adhesives, sealing compounds and coating materials or as an adhesive, sealing compound and coating material. The adhesives, sealing compounds and coating materials, even on thermally sensitive primed and unprimed substrates, gave adhesive films, seals and coatings having excellent performance properties.

In the context of the present invention, actinic radiation means electromagnetic radiation such as visible light, UV light or X-rays, especially UV light, or corpuscular radiation such as electron beams.

Furthermore, in the context of the present invention, oligomers are resins which contain at least 2 to 15 repeating monomer units in their molecule. In the context of the present invention, polymers are resins which contain at least 10 repeating monomer units in their molecule. For further details of these terms refer to Römpp Lexikon Lacke und Druckfarben, Georg Thieme Verlag, Stuttgart, New York, 1998, "oligomers", page 425.

The first essential constituent of the dual-cure composition of the invention is at least one constituent (A).

Depending on its intended use, the constituent (A) is low molecular, oligomeric or polymeric. Where it is used as a crosslinking agent or curing agent (in this regard cf. Römpp Lexikon Lacke und Druckfarben, Georg Thieme Verlag, Stuttgart, N.Y., 1998, "curing", pages 274 to 276), it is preferably low molecular or oligomeric. Where, on the other hand, it is employed as a binder (in this regard, cf. Römpp Lexikon Lacke und Druckfarben, Georg Thieme Verlag, Stuttgart, York, 1998, "binders", pages 73 and 74), it is preferably oligomeric or polymeric.

The parent structures of the low molecular constituents (A) are not critical but may instead originate from any of a very wide variety of classes of organic compound. Examples of suitable classes of compound are alkyl, cycloalkyl, alkylcycloalkyl, cycloalkylalkyl, aryl, alkylaryl, cycloalkylaryl arylalkyl and/or arylcycloalkyl compounds which may contain heteroatoms such as oxygen, nitrogen, sulfur, silicon or phosphorus and which may also carry further substituents which, however, must not react with the carbamate groups, or with the bonds which can be activated with actinic radiation, during the preparation of the constituents (A), during their storage and/or during their use.

The parent structures of the oligomeric or polymeric constituents (A) are likewise not critical and may originate from any of a very wide variety of oligomer and polymer classes. Examples of suitable oligomer and polymer classes are random, alternating and/or block, linear and/or branched and/or comb addition (co)polymers of ethylenically unsaturated monomers, or polyaddition resins and/or polycondensation resins. For further details of these terms refer to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation" and "polycondensation resins". As regards any substituents that may possibly be present, the comments made above apply mutatis mutandis.

Examples of highly suitable addition (co)polymers are poly(meth)acrylates and partially hydrolyzed polyvinyl esters.

Examples of highly suitable polyaddition resins and/or polycondensation resins are polyesters, alkyds, polyurethanes, polylactones, polycarbonates, polyethers, epoxy resin-amine adducts, polyureas, polyamides or polyimides.

The constituent (A) contains on average per molecule at least one primary or secondary, especially primary, carbamate group. Particularly in the case of the oligomeric and polymeric constituents (A), the upper limit on the number of carbamate groups per molecule is imposed essentially only by the molecule's size. In the case of low molecular constituents (A), this number is guided essentially by the functionality of the available starting products. The skilled worker is therefore able to determine with ease the number of carbamate groups that is advantageous in each case.

Moreover, the inventively essential constituent (A) contains on average per molecule at least one bond which can be activated with actinic radiation. The upper limit on the number of bonds per molecule which can be activated with actinic radiation is imposed essentially only by the molecule's size, particularly in the case of the oligomeric and polymeric constituents (A). In the case of low molecular constituents (A), this number is guided essentially by the functionality of the available starting products. The skilled worker is therefore able to determine with ease the advantageous number of bonds which can be activated with actinic radiation.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, particularly the carbon-carbon double bonds, are employed with preference.

Highly suitable carbon-carbon double bonds are present, for example, in (meth)acrylate, ethacrylate, crotonate, cinnamate, vinyl ether, vinyl ester, ethenylarylene, dicyclopentadienyl, norbornenyl, isoprenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups, or ethenylarylene ester, dicyclopentadienyl ester, norbornenyl ester, isoprenyl ester, isopropenyl ester, allyl ester or butenyl ester groups. Of these, (meth)acrylate groups, especially acrylate groups are of particular advantage and are therefore used with very particular preference in accordance with the invention.

The inventively essential constituent (A) may in fact be prepared in any way desired. In accordance with the invention, however, it is of advantage to synthesize it in accordance with the three variants described below.

In the first variant, the preparation of the inventively essential constituent (A) starts from a polyfunctional compound containing on average per molecule at least 2.0 isocyanate-reactive, acid-reactive or epoxide-reactive functional groups.

Examples of suitable isocyanate-reactive functional groups are thiol, primary and secondary amino, primary imino or hydroxyl groups, of which the primary and secondary amino groups and the hydroxyl group are of advantage and the hydroxyl groups are of particular advantage and are therefore employed with particular preference in accordance with the invention.

Examples of suitable acid-reactive functional groups are the abovementioned groups and also epoxide groups, of which the epoxide groups are of advantage and are therefore employed with preference in accordance with the invention.

Examples of suitable epoxide-reactive functional groups are acid groups such as sulfonic acid, phosphonic acid, phosphoric acid or carboxyl groups, especially carboxyl groups, or primary, secondary or tertiary, especially primary, amino groups.

The polyfunctional compounds used with preference in accordance with the invention are, accordingly, polyols, polyamines, amino alcohols, polycarboxylic acids and polyepoxides.

The polyols may be low molecular, oligomeric or polymeric.

Examples of suitable low molecular polyols are diols such as examples of suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethylpropane-1,3-diol, 2-butyl-2-methyl-propane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxymethylbicyclo [2.2.1]heptane, 2,2-diethylpropane-1,3-diol, 2,2-dipropylpropane-1,3-diol, 2-cyclohexyl-2-methylpropane-1,3-diol, 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-(2'-hydroxypropyl)benzene or 1,3-(2'-hydroxypropyl)benzene; triols such as trimethylolethane, trimethylolpropane, glycerol or trishydroxyethyl isocyanurate; tetrols such as pentaerythritol or homopentaerythritol or sugar alcohols such as threitol or erythritol; or pentitols such as arabitol, adonitol or xylitol; or hexitols such as sorbitol, mannitol or dulcitol.

Examples of suitable oligomeric and polymeric polyols are the above-described oligomers and polymers which contain hydroxyl groups.

For further details refer to Römpp Lexikon Lacke und Druckfarben, Georg Thieme Verlag, 1998, "polyols", pages 465 and 466.

Examples of suitable polyamines contain at least two primary and/or secondary amino groups. Polyamines are substantially alkylene polyamines having from 1 to 40 carbon atoms, preferably from about 2 to 15 carbon atoms. They may carry substituents which have no isocyanate-reactive, acid-reactive or epoxide-reactive hydrogen atoms. Examples are polyamines with a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, hexamethylene-1,6-diamine, trimethylhexamethylenediamine, methanediamine, isophoronediamine or 4,4'-diaminodicyclohexylmethane. Preferred diamines are hydrazine, alkyl- or cycloalkyldiamines such as propylenediamine and 1-amino-3-aminomethyl-3,5,5-trimethylcyclohexane.

It is also possible to use polyamines which contain more than two amino groups in the molecule, such as diethylenetriamine, triethylenetetramine, dipropylenediamine and dibutylenetriamine.

For further details refer to Römpp Lexikon Lacke und Druckfarben, Georg Thieme Verlag, 1998, "polyamines", page 458.

Examples of suitable amino alcohols are ethanolamine, diethanolamine or triethanolamine.

Examples of suitable polyepoxides are the customary and known low molecular, oligomeric or polymeric epoxy resins containing at least two epoxide groups in the molecule, such as are preparable by condensing bisphenol A or F with epichlorohydrin, or polypropylene glycol diglycidyl ethers, polybutylene glycol diglycidyl ethers, polytetrahydrofuran glycidyl ethers, triglycidyl isocyanurate or pentaerythritol tetraglycidyl ether. For further details refer to Römpp Lexikon Lacke und Druckfarben, Georg Thieme Verlag, 1998, "epoxy resins", pages 196 and 197.

Examples of suitable polyacids are low molecular, oligomeric or polymeric acids containing at least two acid groups, preferably sulfonic, phosphonic and/or carboxylic acid groups (carboxyl groups), but especially carboxylic acid groups, in the molecule, such as phthalic acid, isophthalic acid, terephthalic acid, phthalic, isophthalic or terephthalic monosulfonate, halophthalic acids such as tetrachlorophthalic or tetrabromophthalic acid, oxalic acid, malonic acid, succinic acid, glutaric acid, adipic acid, pimelic acid, suberic acid, azelaic acid, sebacic acid, undecanedicarboxylic acid, dodecanedicarboxylic acid, maleic acid, fumaric acid or itaconic acid, of which adipic acid, glutaric acid, azelaic acid, sebacic acid, 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid, trimellitic acid, hemimellitic acid, benzenetetracarboxylic acid, cyclohexanetetracarboxylic acid or oligomeric or polymeric polyacrylic acid.

The polyfunctional compounds, especially the polyols, are reacted with at least one compound containing at least one, especially one, of the above-described bonds which can be activated with actinic radiation and also one isocyanate group, one acid group or one epoxide group. The compounds here are reacted with one another in a molar ratio such that the resultant intermediate still always contains on average at least one isocyanate-reactive, acid-reactive or epoxide-reactive functional group.

Examples of suitable compounds contemplated for reaction with the polyfunctional compounds are olefinically unsaturated monomers which carry one acid group per molecule, especially ethylenically unsaturated carboxylic, sulfonic or phosphonic acids having up to 15 carbon atoms in the molecule, particularly acrylic acid, methacrylic acid, ethacrylic acid, crotonic acid, mono(meth)acryloyloxyethyl maleate, mono(meth)acryloyloxyethyl succinate and mono (meth)acryloyloxyethyl phthalate. Of these, acrylic acid has very particular advantages and is therefore used with very particular preference in accordance with the invention.

Further examples of suitable compounds contemplated for reaction with the polyfunctional compounds are monomers containing one isocyanate group in the molecule, such as vinyl isocyanate, methacryloyl isocyanate or 1-(1-isocyanato-1-methylethyl)-3-(1-methylethenyl) benzene (TMI® from the company CYTEC) or adducts of diisocyanates such as isophorone diisocyanate (=5-isocyanato-1-isocyanatomethyl-1,3,3-trimethylcyclohexane), 5-isocyanato-1-(2-isocyanatoeth-1-yl)-1,3,3,-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimer fatty acids, as sold under the commercial designation DDI 1410 by the company Henkel and described in patents DO 97/49745 and WO 97/49747, especially 2-heptyl-3,4-bis(9-isocyanatononyl)-1-pentylcyclohexane, or 1,2-, 1,4- or 1,3-bis (isocyanatomethyl)cyclohexane, 1,2-, 1,4- or 1,3-bis(2-isocyanatoeth-1-yl)cyclohexane, 1,3-bis (3-isocyanatoprop-1-yl) cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight and in particular 20% by weight, as described in patents DE-A-44 14 032, GB-A-1220717, DE-A-16 18 795 or DE-A-17 93 785; toluylene diisocyanate, xylylene diisocyanate, bisphenylene diisocyanate, naphthylene diisocyanate or diphenylmethane diisocyanate with a compound containing an isocyanate-reactive functional group and at least one of the above-described bonds which can be activated with actinic radiation, such as 2-hydroxyethyl, 2-hydroxypropyl, 3-hydroxypropyl, 3-hydroxybutyl, 4-hydroxybutyl, bis(hydroxymethyl) cyclohexane, neopentyl glycol, diethylene glycol, dipropylene glycol, dibutylene glycol, triethylene glycol acrylate, methacrylate, ethacrylate, crotonate, cinnamate, vinyl ether, allyl ether, dicyclopentadienyl ether, norbornenyl ether, isoprenyl ether, isopropenyl ether or butenyl ether;

trimethylolpropane di-, glycerol di-, trimethylolethane di-, pentaerythritol tri- or homopentaerythritol tri-acrylate, -methacrylate, -ethacrylate, -crotonate, -cinnamate, -vinyl ether, -allyl ether, -dicyclopentadienyl ether, -norbornenyl ether, -isoprenyl ether, -isopropenyl ether or -butenyl ether; or reaction products of cyclic esters, such as epsilon-caprolactone, for example, and the hydroxyl-containing monomers described above; or 2-aminoethyl (meth)acrylate and/or 3-aminopropyl (meth)acrylate;

in a molar ratio of 1:1.

Yet further examples of suitable compounds contemplated for the reaction with the polyfunctional compounds are monomers containing one epoxide group in the molecule, such as glycidyl esters of acrylic acid, methacrylic acid, ethacrylic acid, crotonic acid, maleic acid, fumaric acid and/or itaconic acid.

The skilled worker is easily able to use his or her general art knowledge to indicate the appropriate combinations of polyfunctional compound and compounds reactive therewith.

The reaction of the polyfunctional compounds with the compounds reactive therewith takes place in a molar ratio such that the resulting intermediate still always contains at least one isocyanate, acid or epoxide group.

In a second process step, the resulting intermediate is reacted with at least one compound by means of which carbamate groups are introduced, thereby resulting in the constituent (A) for inventive use. In this case the reactants are employed in a molar ratio such that the constituent (A) no longer contains isocyanate, acid or epoxide groups.

Examples of suitable compounds of this kind are urea or aryl- or alkylurethanes, which are also termed carbamates, such as phenylurethane, methylurethane or butylurethane.

Further examples of suitable compounds are phosgene and ammonia, by means of which, as is known, carbamate groups can be introduced into polyols in particular.

According to a second alternative of the first variant, the polyfunctional compounds may be reacted in the first process step with compounds by means of which carbamate groups are introduced and in the second process step with compounds which contain at least one bond which can be activated with actinic radiation and one isocyanate group, acid group or epoxide group.

According to the second variant, the inventively essential constituents (A) are prepared starting from a polyisocyanate, polyepoxide or polyacid, in particular a polycarboxylic acid.

The polyisocyanate contains on average per molecule at least 2.0, preferably more than 2.0, and in particular more than 3.0 isocyanate groups per molecule. There is in principle no upper limit on the number of isocyanate groups; however, it is of advantage in accordance with the invention if the number does not exceed 15, preferably 12, with particular preference 10, with very particular preference 8.0 and in particular 6.0.

Examples of suitable polyisocyanates are polyurethane prepolymers which contain isocyanate groups, can be prepared by reacting polyols with an excess of the above-described diisocyanates and are preferably of low viscosity. It is also possible to use polyisocyanates containing isocyanurate, biuret, allophanate, iminooxadiazinedione, urethane, urea carbodiimide and/or uretdione groups, these polyisocyanates being prepared in a customary and known way from the diisocyanates described above. Example of suitable preparation processes and polyisocyanates are known, for example, from patents CA-A-2,163,591, U.S. Pat. Nos. 4,419,513, 4,454,317, EP-A-0 646 608, U.S. Pat. No. 4,801,675, EP-A-0 183 976, DE-A-40 15 155, EP-A-0 303 150, EP-A-0 496 208, EP-A-0 524 500, EP-A-0 566 037, U.S. Pat. Nos. 5,258,482, 5,290,902, EP-A-0 649 806, DE-A-42 29 183 or EP-A-0 531 820.

Examples of suitable polyacids are those described above.

Examples of suitable polyepoxides are those described above.

According to the first alternative of the second variant, the polyisocyanate, polyepoxide or polyacid is reacted in a first process step with at least one compound which contains at least one of the above-described bonds which can be activated with actinic radiation and one of the above-described isocyanate-reactive, acid-reactive or epoxide-reactive functional groups, in a molar ratio such that the resulting intermediate still always contains on average at least one isocyanate group, acid group or epoxide group.

According to the second alternative of the second variant, the polyisocyanate, polyacid or polyepoxide is reacted in a first process step with at least one compound which contains at least one carbamate group or one functional group which can be converted into a carbamate group, and also one of the above-described isocyanate-reactive, acid-reactive or epoxide-reactive functional groups, in a molar ratio such that the resulting intermediate still always contains on average at least one isocyanate, acid or epoxide group.

In the second process step, the intermediate of the first alternative of the second variant is reacted with at least one compounds containing at least one carbamate group or one functional group which can be converted into carbamate groups, in a molar ratio such that the resulting constituent (A) no longer contains any isocyanate, acid or epoxide groups.

Examples of suitable compounds containing at least one carbamate group are hydroxyethyl carbamate or hydroxypropyl carbamate. An example of a suitable functional group which can be converted into a carbamate group is the cyclic ethylene carbonate group, which can be converted into a primary carbamate group using ammonia. The ethylene carbonate group itself may be prepared by reacting the polyisocyanate, polyacid or polyepoxide with, for example, glycidol and subsequently reacting the epoxide groups with carbon dioxide. In the case of the polyepoxides, it should be ensured that for the reaction with carbon dioxide there are no longer any epoxide groups present attached to the parent structure.

In the second process step, the intermediate of the second alternative of the second variant is reacted with at least one of the above-described compounds containing at least one of the above-described bonds which can be activated with actinic radiation and one of the above-described isocyanate-reactive, acid-reactive or epoxide-reactive functional groups, in a molar ratio such that the resulting inventively essential constituent (A) no longer contains any isocyanate, acid or epoxide groups.

In the third variant of the preparation of the inventively essential constituent (A) the polyisocyanates, polyacids or polyepoxides are reacted statistically in a one-pot process with the above-described compounds which contain at least one bond which can be activated with actinic radiation and one isocyanate-reactive, acid-reactive or epoxide-reactive group, and with the above-described compounds which contain at least one carbamate group or functional group which can be converted into a carbamate group, and one isocyanate-reactive, acid-reactive or epoxide-reactive functional group. For this reaction a molar ratio is employed such that the resulting inventively essential constituent (A) no longer contains any isocyanate, acid groups or epoxide groups.

In accordance with the invention the first, second and third variants of the preparation of the inventively essential constituent (A) may be varied by choosing, in the case of variants 1 to 3, the molar ratios of the reactants in such a way that the respective resultant constituent (A) still contains at least one isocyanate-reactive, acid-reactive or epoxide-reactive functional group (variant 1) or at least one isocyanate, acid or epoxide group (variants 2 and 3) which is reacted with at least one compound which contains an isocyanate, acid or epoxide group (variant 1) or an isocyanate-reactive, acid-reactive or epoxide-reactive functional group (variants 2 and 3) and also at least one functional group which is different than carbamate groups, than groups which can be converted into carbamate groups and than bonds which can be activated with actinic radiation (variants 1 to 3). In this way the profile of properties of the inventively essential constituent (A) may advantageously be varied widely by, for example, the incorporation of hydrophilic or hydrophobic groups. Examples of suitable compounds by means of which hydrophobic groups may be introduced are fatty alcohols such as stearyl alcohol. Examples of suitable compounds by means of which hydrophilic groups may be introduced are poly(ethylene oxide) monoalkyl ethers. It is however, also possible to use this method to bind the photoinitiators (C) and other auxiliaries (C) described below chemically to the constituents (A).

Viewed in terms of their method, the above-described processes for preparing the inventively essential constituent (A) have no specialty; instead, the apparatus and processes known from organic chemistry and from polymer chemistry are used, with attention being paid to the precautionary measures prescribed for the handling of phosgene and polyisocyanates.

The fraction of the inventively essential constituent (A) in the dual-cure composition of the invention may vary extremely widely and is guided in particular by the intended use and by the other constituents present, especially constituent (B). The fraction of (A) is preferably from 1.0 to 99%, more preferably from 2.0 to 98%, with particular preference from 3.0 to 97%, with very particular preference from 4.0 to 96% and in particular from 5.0 to 95% by weight, based in each case on the total amount of (A) and (B).

The further essential constituent of the dual-cure composition of the invention is at least one constituent (B) containing on average per molecule at least one carbamate-reactive functional group and also, where appropriate, at least one of the above-described bonds which can be activated with actinic radiation.

Examples of suitable carbamate-reactive functional groups are N-methylol or N-methylol ether groups.

Depending on its intended use, the constituent (B) is low molecular, oligomeric or polymeric. Where it is used as a crosslinking agent or curing agent (in this regard cf. Römpp Lexikon Lacke und Druckfarben, Georg Thieme Verlag, Stuttgart, N.Y., 1998, "curing", pages 274 to 276), it is preferably low molecular or oligomeric. Where, on the other hand, it is employed as a binder (in this regard, cf. Römpp Lexikon Lacke und Druckfarben, Georg Thieme Verlag, Stuttgart, York, 1998, "binders", pages 73 and 74), it is preferably oligomeric or polymeric. As regards the parent structures, the comments made above in connection with the constituent (A) apply analogously.

Preferably, the constituent (B) is an amino resin.

Examples of suitable amino resins are customary and known, and numerous representatives are available commercially.

Examples of highly suitable amino resins are melamine resins, guanamine resins or urea resins. In this context it is possible to use any amino resins suitable for transparent topcoat materials or clearcoat materials, or a mixture of such amino resins. For further details refer to Römpp Lexikon Lacke und Druckfarben, Georg Thieme Verlag, 1998, page 29, "amino resins", and the textbook "Lackadditive" [Additives for Coatings] by Johan Bieleman, Wiley-VCH, Weinheim, N.Y., 1998, pages 242 ff., or to the book "Paints, Coatings and Solvents", second completely revised edition, edited by D. Stoye and W. Freitag, Wiley-VCH, Weinheim, N.Y., 1998, pages 80 ff. Also suitable, furthermore, are the customary and known amino resins some of whose methylol and/or methoxymethyl groups have been defunctionalized by means of carbamate or allophanate groups. Crosslinking agents of this kind are described in U.S. Pat. No. 4,710,542 and EP-B-0 245 700 and also in the article by B. Singh and co-workers "Carbamylmethylated Melamines, Novel Crosslinkers for the Coatings Industry" in Advanced Organic Coatings Science and Technology Series, 1991, Volume 13, pages 193 to 207.

The fraction of the inventively essential constituent (B) in the dual-cure composition of the invention may vary extremely widely and is guided in particular by the intended use and by the other constituents present, especially the constituent (B). The fraction of (B) is preferably from 1.0 to 99%, more preferably from 2.0 to 98%, with particular preference from 3.0 to 97%, with very particular preference from 4.0 to 96% and in particular from 5.0 to 95% by weight, based in each case on the total amount of (A) and (B).

In the dual-cure composition of the invention the above-described inventively essential constituents (A) and (B) may be combined with one another in different ways.

In a first preferred combination, the constituents (A) are oligomeric and/or polymeric compounds and the constituents (B) are low molecular and/or oligomeric compounds.

In a second preferred combination, the constituents (A) are low molecular and/or oligomeric compounds and the constituents (B) are oligomeric and/or polymeric compounds.

In a third preferred combination the constituents (A) are low molecular and/or oligomeric compounds and the constituents (B) are low molecular and/or oligomeric compounds. This combination is employed especially when the dual-cure composition of the invention is to have a particularly high solids content.

In the fourth preferred combination, both the constituents (A) and the constituents (B) are oligomeric and/or polymeric compounds. This combination is employed especially in the case of emission-free liquid or solid 100% systems.

Otherwise, the combination is guided by the intended use and aggregate state of the dual-cure composition of the invention and may therefore be selected by the skilled worker on the basis of his or her general art knowledge with the assistance where appropriate of simple preliminary range-finding experiments.

Accordingly, the dual-cure composition of the invention may serve as a dual-cure adhesive of the invention, a dual-cure sealing compound of the invention or a dual-cure coating material of the invention. It may further serve for preparation of said adhesive, said sealing compound or said coating material. The dual-cure adhesives, sealing compounds and coating materials of the invention may be liquid solvent-borne systems (conventional systems), liquid solvent-free systems (100% systems) or solvent-free solid systems. In the case of coating materials, the solvent-free solid systems are also referred to as powder coating materials. They may also be dispersed in water. Dispersions of this kind are also referred to by those in the art as powder slurry coating materials.

The dual-cure composition of the invention possesses particular advantages in the context of its use as an inventive dual-cure coating material. In this context it may be used as a surfacer, solid-color topcoat material, basecoat material or clearcoat material, but especially as a clearcoat material.

The dual-cure composition of the invention may comprise at least one additive (C). The selection is guided in particular by the intended use of the dual-cure composition of the invention. These additives (C) are preferably nonvolatile under the processing and application conditions of the dual-cure composition of the invention.

Where the dual-cure coating material of the invention is used as a surfacer, topcoat material or basecoat material, it comprises as additives (C) color and/or effect pigments (C) in customary and known amounts. The pigments (C) may be composed of organic or inorganic compounds and may impart effect and/or color. Owing to this multiplicity of suitable pigments (C), therefore, the dual-cure coating material of the invention ensures a universal scope for use of the dual-cure coating materials and permits the realization of a multiplicity of color shades and optical effects.

As effect pigments (C) it is possible to use metal flake pigments such as commercial aluminum bronzes, aluminum bronzes chromated in accordance with DE-A-36 36 183, and commercial stainless steel bronzes and also nonmetallic effect pigments, such as pearlescent pigments and interference pigments, for example. For further details refer to Römpp Lexikon Lacke und Druckfarben, Georg Thieme Verlag, 1998, pages 176, "effect pigments" and pages 380 and 381 "metal oxide-mica pigments" to "metal pigments".

Examples of suitable inorganic color pigments (C) are titanium dioxide, iron oxides, Sicotrans yellow and carbon black. Examples of suitable organic color pigments (C) are thioindigo pigments, indanthrene blue, Chromophthal red, Irgazine orange and Heliogene green. For further details refer to Römpp Lexikon Lacke und Druckfarben, Georg Thieme Verlag, 1998, pages 180 and 181, "iron blue pigments" to "black iron oxide", pages 451 to 453 "pigments" to "pigment volume concentration", page 563 "thioindigo pigments" and page 567 "titanium dioxide pigments".

The dual-cure coating material of the invention, particularly as a surfacer, may further comprise organic and inorganic fillers (C) in customary and known, effective amounts. Examples of suitable fillers (C) are chalk, calcium sulfate, barium sulfate, silicates such as talc or kaolin, silicas, oxides such as aluminum hydroxide or magnesium hydroxide or organic fillers such as textile fibers, cellulose fibers, polyethylene fibers or wood flour. For further details refer to Römpp Lexikon Lacke und Druckfarben, Georg Thieme Verlag, 1998, pages 250 ff., "fillers".

These pigments and fillers (C) may also be incorporated by way of pigment pastes into the dual-cure coating materials of the invention.

The above-described pigments and fillers (C) are absent if the dual-cure coating materials of the invention are used, in their very particularly preferred end use, as clearcoat materials.

Examples of suitable additives (C) that may be present in the clearcoat materials, surfacers, basecoat materials and topcoat materials of the invention are customary and known oligomeric and polymeric binders such as thermally curable linear and/or branched and/or block, comb and/or random poly(meth)acrylates or acrylate copolymers, polyesters, alkyds, polyurethanes, acrylated polyurethanes, acrylated polyesters, polylactones, polycarbonates, polyethers, epoxy resin-amine adducts, (meth)acrylate diols, partially hydrolyzed polyvinyl esters or polyureas;

customary and known reactive diluents curable thermally and/or with actinic radiation, such as positionally isomeric diethyloctanediols or hydroxyl-containing hyperbranched compounds or dendrimers, (meth)acrylates with a functionality of two or more such as trimethylolpropane tri(meth)acrylate, or polyisocyanates containing (meth)acrylate groups;

crosslinking agents such as compounds or resins containing anhydride groups, compounds or resins containing epoxide groups, tris(alkoxycarbonylamino)triazines, compounds or resins containing carbonate groups, blocked and/or nonblocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, as described in European patent EP-A-0 596 460;

low-boiling and/or high-boiling organic solvents ("long solvents");

UV absorbers;

light stabilizers such as HALS compounds, benzotriazoles or oxalanilides;

free-radical scavengers;

photoinitiators such as those of the Norrish II type, whose mechanism of action is based on an intramolecular variant of the hydrogen abstraction reactions such as occur diversely in photochemical reactions (by way of example, reference may be made here to Römpp Chemie Lexikon, $9^{th}$ expanded and revised edition, Georg Thieme Verlag, Stuttgart, Vol. 4, 1991) or cationic photoinitiators (by way of example, reference may be made here to Römpp Lexikon Lacke und Druckfarben, Georg Thieme Verlag, Stuttgart, 1998, pages 444 to 446), especially benzophenones, benzoins or benzoin ethers or phosphine oxides;

thermolabile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azodinitriles or benzpinacol silyl ethers;

crosslinking catalysts such as dibutyltin dilaurate, lithium decanoate or zinc octoate or strong acids such as sulfonic acids, which may have been blocked with amines;

devolatilizers, such as diazadicycloundecane;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfoacids of alkoxylated alkanols and polyols, phenols and alkylphenols;

wetting agents such as siloxanes, fluoric compounds, carboxylic monoesters, phosphoric esters, polyacrylic acids and their copolymers or polyurethanes;

adhesion promoters such as tricyclodecanedimethanol;

leveling agents;

film-forming auxiliaries such as cellulose derivatives;

transparent fillers based on silica, alumina or zirconium oxide; for further details refer to Römpp Lexikon Lacke und Druckfarben, Georg Thieme Verlag, Stuttgart, 1998, pages 250 to 252;

sag control agents such as ureas, modified ureas and/or silicas, as described, for example, in the references EP-A-192 304, DE-A-23 59 923, DE-A-18 05 693, WO 94/22968, DE-C-27 51 761, WO 97/12945 or "farbe+ lack", 11/1992, pages 829 ff.;

rheology control additives, such as those known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly(meth) acrylamide, poly(meth)acrylic acid, polyvinylpyrrolidone, styrene-maleic anhydride copolymers or ethylene-maleic anhydride copolymers and their derivatives or hydrophobically modified ethoxylated urethanes or polyacrylates;

flame retardants and/or flatting agents such as magnesium stearate.

Further examples of suitable additives (C) are described in the textbook "Lackadditive" by Johan Bieleman, Wiley-VCH, Weinheim, N.Y., 1998.

These additives (C) are added to the coating materials of the invention in customary and known, effective amounts, which depending on additive (C) are from 0.001 to 500 parts by weight per 100 parts by weight of the inventively essential constituents (A) and (B).

The above-described additives (C) may also be present in the dual-cure adhesives and sealing compounds of the invention, provided they are suitable for these end uses, something which the skilled worker is easily able to determine on the basis of his or her general art knowledge.

The preparation of the dual-cure compositions of the invention has no special features but instead takes place in a customary and known way by mixing of the above-described constituents in suitable mixing equipment such as stirred tanks, dissolvers, stirrer mills or extruders by the techniques suitable for the preparation of the respective dual-cure compositions of the invention.

The dual-cure adhesives of the invention are used for producing the adhesive films of the invention on primed and unprimed substrates.

The dual-cure sealing compounds of the invention are used for producing the seals of the invention on and/or in primed and unprimed substrates.

The dual-cure coating materials of the invention are used for producing single-coat or multicoat clearcoat systems and/or color and/or effect paint systems on primed and unprimed substrates. The dual-cure compositions of the invention are found particularly advantageous in this utility. Very particular advantages result in connection with their use for producing clearcoat systems, especially as part of what is known as the wet-on-wet technique, in which a basecoat material, especially an aqueous basecoat material, is applied to the primed or unprimed substrate and dried but without being cured, after which a clearcoat material is applied to the basecoat film and the resulting clearcoat film is cured together with the basecoat film, thermally and with actinic radiation.

Suitable substrates include all surfaces to be coated which are undamaged by curing of the coatings present thereon using heat and actinic radiation combined; examples are the metals, plastics, wood, ceramic, stone, textiles fiber composites, leather, glass, glass fibers, glass wool, rock wool, mineral- and resin-bound building materials, such as plasterboards and cement slabs or roof tiles, and assemblies of these materials. Accordingly, the coatings, adhesive films or seals of the invention are also suitable for applications outside of automotive OEM finishing and automotive refinishing. They are especially suitable for the coating, bonding and sealing of furniture and for industrial coating, including coil coating, container coating, and the impregnation or coating of electrical components. In the context of industrial applications, they are suitable for the coating, bonding and sealing of virtually all parts for private or industrial use, such as radiators, domestic appliances, small metal parts such as nuts and bolts, hubcaps, wheel rims, packaging, or electrical components such as motor windings or transformer windings.

In the case of electrically conductive substrates it is possible to use primers, which are produced in a customary and known manner from electrodeposition coating materials. Suitable for this purpose are both anodic and cathodic electrodeposition coating materials, but especially cathodics.

It is also possible to coat, bond or seal primed or unprimed plastics such as, for example, ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728T1). Unfunctionalized and/or apolar substrate surfaces may be subjected to a conventional pretreatment prior to coating, such as with a plasma or by flaming, or may be provided with a water-based primer.

The application of the dual-cure composition, especially dual-cure coating material, of the invention may take place by any customary application method, such as spraying, knife coating, brushing, flow coating, dipping, impregnating, trickling or rolling. The substrate to be coated may itself be at rest, with the application device or unit being moved. Alternatively, the substrate to be coated, especially a coil, may be moved, with the application unit being at rest relative to the substrate or being moved appropriately.

It is preferred to employ spray application methods, such as compressed air spraying, airless spraying, high-speed rotation, electrostatic spray application (ESTA), for example, alone or in conjunction with hot spray application such as hot air spraying, for example. Application may take place at temperatures of max. 70 to 80° C., so that appropriate application viscosities are attained without any change or damage to the coating material and its overspray (which may be intended for reprocessing) during the short period of thermal stress. For instance, hot spraying may be configured in such a way that the coating material is heated only very briefly in the spray nozzle or shortly before the spray nozzle.

The spray booth used for application may, for example, be operated with a circulation system, which may be temperature-controllable, and which is operated with an appropriate absorption medium for the overspray, an example of such medium being the coating material itself.

Application is preferably carried out under illumination with visible light with a wavelength of more than 550 nm or in the absence of light. This prevents any material damage to or change in the coating material and the overspray.

In general, the surfacer film, topcoat film, basecoat film and clearcoat film are applied in a wet film thickness such that their curing results in coats having the thicknesses which are advantageous and necessary for their functions. In the case of the surfacer film, this thickness is from 10 to 150, preferably from 15 to 120, with particular preference from 20 to 100, and in particular from 25 to 90 $\mu$m; in the case of the topcoat it is from 5 to 90, preferably from 10 to 80, with particular preference from 15 to 60, and in particular from 20 to 50 $\mu$m; in the case of the basecoat it is from 5 to 50, preferably from 10 to 40, with particular preference from 12 to 30 and in particular from 15 to 25 $\mu$m; and in the case of the clearcoats it is from 10 to 100, preferably from 15 to 80, with particular preference from 20 to 70, and in particular from 25 to 60 $\mu$m.

Application is preferably carried out under illumination with visible light with a wavelength of more than 550 nm or in the absence of light. This prevents any material damage to or change in the coating material I and the overspray.

Curing may take place after a certain rest period. This period may have a duration of from 30 s to 2 h, preferably from 1 min to 1 h, and in particular from 1 min to 30 min. The rest period is used, for example, for leveling and devolatilization of the applied films or for the evaporation of volatile constituents such as solvents, water or carbon dioxide, if the dual-cure composition of the invention was applied using super critical carbon dioxide as solvent. The rest period may be shortened and/or assisted by the application of elevated temperatures up to 80° C., provided this does not entail any damage or alteration to the applied films, such as premature complete crosslinking, for instance.

In accordance with the invention, curing takes place with actinic radiation, especially UV radiation, and/or electron beams. If desired, it may be carried out with or supplemented by actinic radiation from other radiation sources. In the case of electron beams it is preferred to operate under an inert gas atmosphere. This may be ensured, for example, by supplying carbon dioxide and/or nitrogen directly to the surface of the applied films.

In the case of curing with UV radiation as well it is possible to operate under inert gas in order to prevent the formation of ozone.

Curing with actinic radiation is carried out using the customary and known radiation sources and optical auxiliary measures. Examples of radiation sources that are suitable include high or low pressure mercury vapor lamps, which may have been doped with lead in order to open up a radiation window up to 405 nm, or electron beam sources. The arrangement of these sources is known in principle and may be adapted to the circumstances of the workpiece and the process parameters. In the case of workpieces of complex shape, such as automobile bodies, those regions not accessible to direct radiation (shadow regions) such as cavities, folds and other structural undercuts may be cured using pointwise, small-area or all-round emitters, in conjunction with an automatic movement device for the irradiation of cavities or edges.

The equipment and conditions for these curing methods are described, for example in R. Holmes, U.V. and E.B. Curing Formulations for Printing Inks, Coatings and Paints, SITA Technology, Academic Press, London, United Kingdom 1984.

Curing here may take place in stages, i.e., by multiple exposure to light or actinic radiation. It may also be carried out alternatingly, i.e., by curing alternately with UV radiation and electron beams.

The thermal curing has no special features in terms of its method but instead takes place in accordance with the customary and known methods such as heating in a forced-air oven or irradiation with IR lamps. Thermal curing, like actinic radiation curing, may also take place in stages. Advantageously, thermal curing is effected at a temperature >90° C., preferably from 90 to 180° C., with particular preference from 110 to 160° C., and in particular from 120 to 150° C., for a period of from 1 min to 2 h, with particular preference from 2 min to 1 h, and in particular from 3 min to 30 min.

Thermal curing and curing with actinic radiation may be used simultaneously or alternately. Where the two curing methods are used alternately, it is possible, for example, to begin with the thermal curing and to end with actinic radiation curing. In other cases it may prove advantageous to begin and to end with the actinic radiation curing. The skilled worker is able to determine the curing method most advantageous for the particular case in hand on the basis of his or her general art knowledge with the assistance where appropriate of simple preliminary experiments.

The adhesive films and seals of the invention produced from the dual-cure adhesives and sealing compounds of the invention have an outstanding bond strength and sealing capacity even under extreme climatic conditions and even over long periods of time.

The coatings of the invention produced from the dual-cure coating materials of the invention exhibit outstanding levelling and an outstanding overall visual appearance. They are stable to weathering and do not yellow even under tropical conditions. They can therefore be used in both the interior and the exterior sector.

Accordingly, the primed and unprimed substrates of the invention, especially bodies of automobiles and commercial vehicles, industrial components, including plastics parts, packaging, coils and electrical components, or furniture that have been coated with at least one coating of the invention, sealed with at least one seal of the invention and/or bonded with at least one adhesive of the invention have particular technical and economic advantages, in particular a long service life, which makes them particularly attractive to users.

What is claimed is:

1. A dual-cure composition curable thermally and with actinic radiation, comprising A) at least one constituent comprising on average per molecule at least one primary or secondary carbamate group and at least one bond which can be activated with actinic radiation, which constituent is obtained by a method selected from the group consisting of method 1.1, method 1.2, method 2.1, method 2.2, and method 3, wherein method 1.1 comprises
in a first process step, reacting at least one polyfunctional compound comprising at least two isocyanate-reactive, acid-reactive or epoxide-reactive functional groups with in each case at least one compound comprising an isocyanate group, acid group or epoxide groups and also at least one bond which can be activated with actinic radiation, to form an intermediate, and subsequently,
in a second process step, reacting the resultant intermediate, which on average still contains at least one free isocyarlate-reactive, acid-reactive or epoxide-reactive functional group, with in each case at least one compound by means of which carbamate groups are introduced; method 1.2 comprises, in a first process step, reacting at least one polyfunctional compound comprising at least two isocyanate-reactive, acid-reactive or epoxide-reactive functional groups with in each case at least one compound by means of which carbamate groups are introduced, to form an intermediate, and subsequently, in a second process step, reacting the resultant intermediate, which on average still contains at least one free isocyanate-reactive, acid-reactive or epoxide-reactive functional group, with in each case at least one compound containing an isocyanate group, acid group or epoxide groups and also at least one bond which can be activated with actinic radiation;

method 2.1 comprises in a first process step, reacting at least one polyisocyanate, polyacid or polyepoxide with in each case at least one compound comprising at least one bond which can be activated with actinic radiation and also one isocyanate-reactive, acid-reactive or epoxide-reactive functional group, to form an intermediate, and subsequently reacting the intermediate, which on average still contains at least one isocyanate group, acid group or epoxide group, in a second process step with in each case at least one compound comprising at least one carbamate group or at least one functional group which can be converted into carbamate groups, and also containing an isocyanate-reactive, acid-reactive or epoxide-reactive functional group;

method 2.2 comprises in a first process step, reacting at least one polyisocyanate, polyacid or polyepoxide with in each case at least one compound comprising at least one carbamate group or at least one functional group which can converted into carbamate groups, and also an isocyanate-reactive, acid-reactive or epoxide-reactive functional group, to form an intermediate, and subsequently reacting the intermediate, which on average still contains at least one isocyanate group, acid group or epoxide group, in a second process step with in each case at least one compound comprising at least one bond which can be activated with actinic radiation and also one isocyanate-reactive acid-reactive or epoxide-reactive functional group; and method 3 comprises, reacting at least one polyisocyanate, polyacid or polyepoxide in a one-pot process with at least one Compound comprising at least one carbamate group or at least one functional group which can be converted into a carbamate group, and also one isocyanate-reactive, acid-reactive or epoxide-reactive functional group, and at least one compound comprising at least one bond which can be activated with actinic radiation and also one isocyanate-reactive, acid-reactive or epoxide-reactive functional group; and B) at least one constituent comprising on average per molecule at least one carbamate-reactive functional group.

2. The dual-cure composition of claim 1, characterized in that in each of methods 1.1, 1.2, 2.1, 2.2, and 3, the molar ratios of the reactants are chosen so that the respective resulting constituent (A) no longer contains any isocyanate, acid or epoxide groups.

3. The dual-cure composition of claim 1, characterized in that each of methods 1.1, 1.2, 2.1, and 2.2, the at least one compound reacted with the intermediate further comprises at least one functional group which is different than carbamate groups, than groups which can be converted into carbamate groups and than bonds which can be activated with actinic radiation.

4. The dual-cure composition of claim 1, characterized in that the constituent (A) comprises primary carbamate groups.

5. The dual-cure composition of claim 1, characterized in that the bonds which can be activated with actinic radiation are at least one of carbon-hydrogen single bonds, carbon-carbon, carbon-oxygen, carbon-nitrogen, carbon-phosphows or carbon-silicon single bonds or double bonds.

6. The dual-cure composition of claim 5, characterized in that the double bonds are present in the form of one or more groups or compounds selected from the group consisting of (meth)acrylate, ethacrylate, crotonate, cinnamate, vinyl ether, vinyl ester, ethenylarylene, dicyclopentadienyl, norbornenyl, isoprenyl, isoprenyl, isopropenyl, allyl groups, butenyl; ethenylarylene ether, dicyclopentadienyl ether, norbomenyl ether, isoprenyl ether, isopropenyl ether, allyl ether, butenyl ether groups, or ethenylarylene ester, dicyclopentadienyl ester, norbomenyl ester, isoprenyl ester, isopropenyl ester, allyl ester, butenyl ester groups, and mixtures thereof.

7. The dual-cure composition of claim 1, characterized in that the isocyanate-reactive functional groups are selected from the group of thiol, primary or secondary amino, imino or hydroxyl groups.

8. The dual-cure composition of claim 7, characterized in that the acid-reactive functional groups are selected from the group consisting of thiol, primary or secondary amino, imino groups, hydroxyl groups, and epoxide groups.

9. A The dual-cure composition of claim 7, characterized in that the epoxide-reactive functional groups are selected from the group consisting of acid groups, primary amino groups, secondary amino groups, and tertiary amino groups.

10. The dual-cure composition of claim 1, characterized in that N-methylol and/or N-methylol ether groups are used as carbamate-reactive functional groups.

11. The dual-cure composition of claim 1, characterized in that it further comprises at least one additive (C).

12. A composition suitable for use as an adhesive, sealing compound or coating material, the composition comprising the dual-cure composition of claim 1.

13. The composition of claim 1 wherein constituent B further comprises at least one bond which can be activated with actinic radiation.

14. A process of making a coated film comprising: applying the composition of claim 1 to a substrate and forming the coated film.

15. The process of claim 14 wherein the coated film is a multicoat color and/or effect paint system.

16. The coated film produced by the process according to claim 14, wherein the coated film is an adhesive film.

* * * * *